(12) United States Patent
Cleveland (10) Patent No.: US 10,626,898 B1
(45) Date of Patent: Apr. 21, 2020

(54) ACCESSORY HOLDER (71) Applicant: Kerri Cleveland, Sherman Oaks, CA (US)

(72) Inventor: Kerri Cleveland, Sherman Oaks, CA (US)

(*) Notice: Subject to any disclaimer, the term of this patent is extended or adjusted under 35 U.S.C. 154(b) by 0 days.

(21) Appl. No.: 16/402,299

(22) Filed: May 3, 2019

Related U.S. Application Data (60) Provisional application No. 62/677,235, filed on May 29, 2018.

(51) Int. Cl.
F16B 2/08 (2006.01)
F16M 13/02 (2006.01)
G06F 1/16 (2006.01)

(52) U.S. Cl.
CPC .............. F16B 2/08 (2013.01); F16M 13/022 (2013.01); G06F 1/1613 (2013.01)

(58) Field of Classification Search
USPC ............... 224/250; 248/229.17, 228.8, 230.8
See application file for complete search history.

(56) References Cited

U.S. PATENT DOCUMENTS

| | | | | |
|---|---|---|---|---|
| 3,718,241 A * | 2/1973 | Forsythe | ................ | A41F 9/002 224/250 |
| 5,941,434 A * | 8/1999 | Green | ................ | A45F 5/02 224/195 |
| 6,015,073 A * | 1/2000 | Wojciak | ................ | A41F 9/002 2/312 |
| 6,264,081 B1 * | 7/2001 | Wojciak | ................ | A41F 9/002 2/312 |
| 8,011,545 B2 * | 9/2011 | Murdoch | ................ | A45F 5/02 224/672 |
| 8,499,990 B2 * | 8/2013 | Smith | ................ | A45F 5/02 224/250 |
| 2015/0351571 A1 * | 12/2015 | Johnson | ................ | A45F 5/00 224/250 |
| 2016/0120264 A1 * | 5/2016 | Bardini | ................ | A43C 1/00 36/50.1 |

* cited by examiner

Primary Examiner — Alfred J Wujciak
(74) Attorney, Agent, or Firm — Harness, Dickey & Pierce, P.L.C.

(57) ABSTRACT

A holder includes an elongated base having a first end, a second end and a fastening strap extending from the first end of the base to the second end of the base. The fastening strap extends around a device. A first accessory securement loop is disposed around the base for receiving a first accessory therein.

15 Claims, 10 Drawing Sheets

ACCESSORY HOLDER

CROSS-REFERENCE TO RELATED APPLICATIONS

This application is a non-provisional application of U.S. Patent Provisional Application No. 62/677,235 filed on May 29, 2018. The entire disclosures the above application is incorporated herein by reference.

FIELD

The present disclosure relates to an accessory holder and, more particularly, to an accessory holder suitable for non-invasively securing the accessory to a device such as a computing device.

BACKGROUND

This section provides background information related to the present disclosure which is not necessarily prior art.

In today's business environment there are typically many meetings. One tool for a successful meeting is a laptop computer. A laptop computer may be used for taking notes or presenting content in a meeting. Laptop computers have a mouse associated therewith. People also carry cellphones, a cup of coffee or other items from meeting to meeting. However, it can become awkward to carry all of these items successfully to the next meeting.

SUMMARY

This section provides a general summary of the disclosures, and is not a comprehensive disclosure of its full scope or all of its features.

The present disclosure provides an accessory holder that aids in the simultaneous movement of various devices from place to place.

In a first aspect of the disclosure, a holder includes an elongated base having a first end, a second end, and a fastening strap extending from the first end of the base to the second end of the base. The fastening strap extends around a device. A first accessory securement loop is disposed around the base for receiving a first accessory therein.

In another aspect of the disclosure, a holder includes an at least semi-rigid elongated base having a first end and a second end. A flexible fastening strap having a first end coupled to the first end of the base and a second end adjustably coupled to the second end of the base. The fastening strap adjustably extending around a device. A first accessory securement loop is coupled to the base for and elastically securing the accessory between the first accessory securement loop and the base.

Further areas of applicability will become apparent from the description provided herein. The description and specific examples in this summary are intended for purposes of illustration only and are not intended to limit the scope of the present disclosure.

DETAILED DESCRIPTION

Examples will now be described more fully with reference to the accompanying drawings. Although the following description includes several examples of a laptop computer, it is understood that the features herein may be applied to any appropriate device, such as a tablet computer, portable television or medical devices. The examples disclosed below are not intended to be exhaustive or to limit the disclosure to the precise forms disclosed in the following detailed description. Rather, the examples are chosen and described so that others skilled in the art may utilize their teachings.

Figure 1:
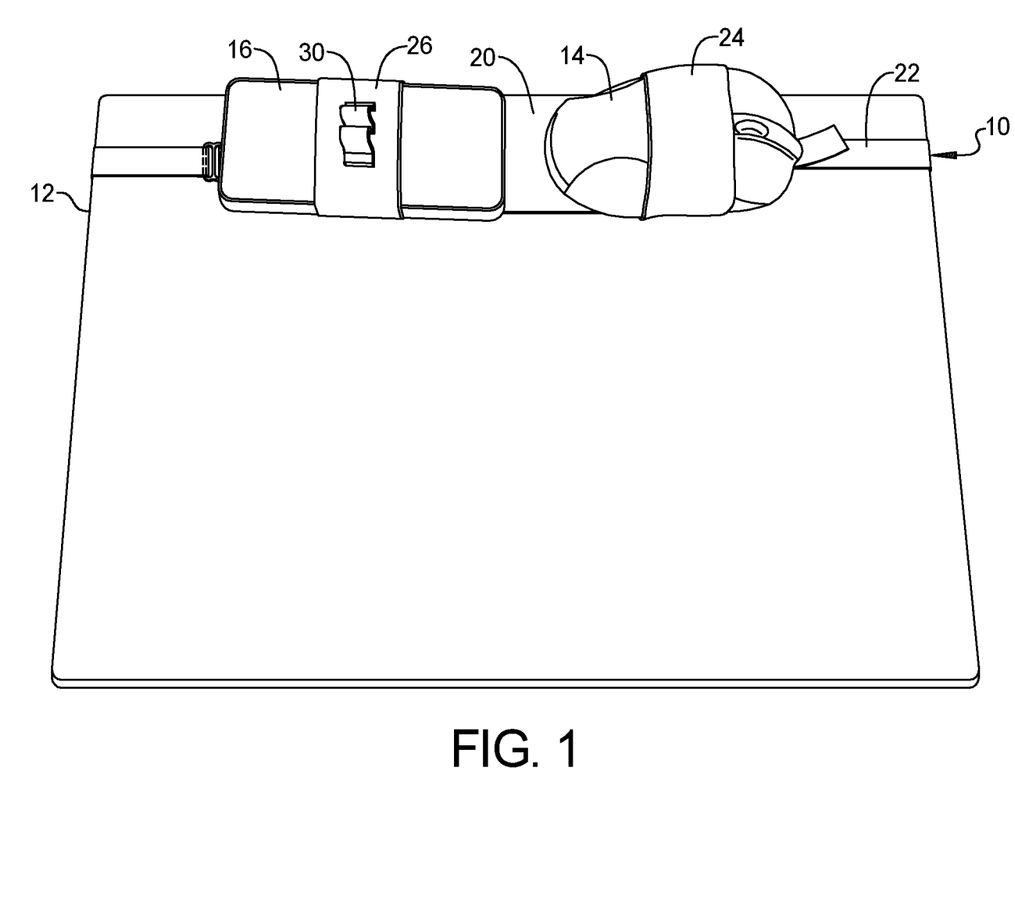
FIG. 1 is a top view of a laptop having the holder of the present disclosure.

Referring now to FIG. 1, a holder 10 is illustrated coupled to a device such as a laptop computer 12. Of course, various types of devices, not just a laptop, may benefit by using the holder 10. The holder 10 extends around or a portion of the laptop 12. The holder 10 is used to secure, in this example, a first accessory 14 and a second accessory 16.

The holder 10 includes an elongated base 20, a fastening strap 22, a first accessory securement loop 24 and a second accessory securement loop 26. As will be described in more detail below, one or more accessory securement loops such as the second accessory securement loop 26 may comprise a secondary loop 30. The secondary loop 30 may be used for carrying a smaller instrument or device such as a stylus, pen, pencil, cords, dongles and the like.

Figure 2:
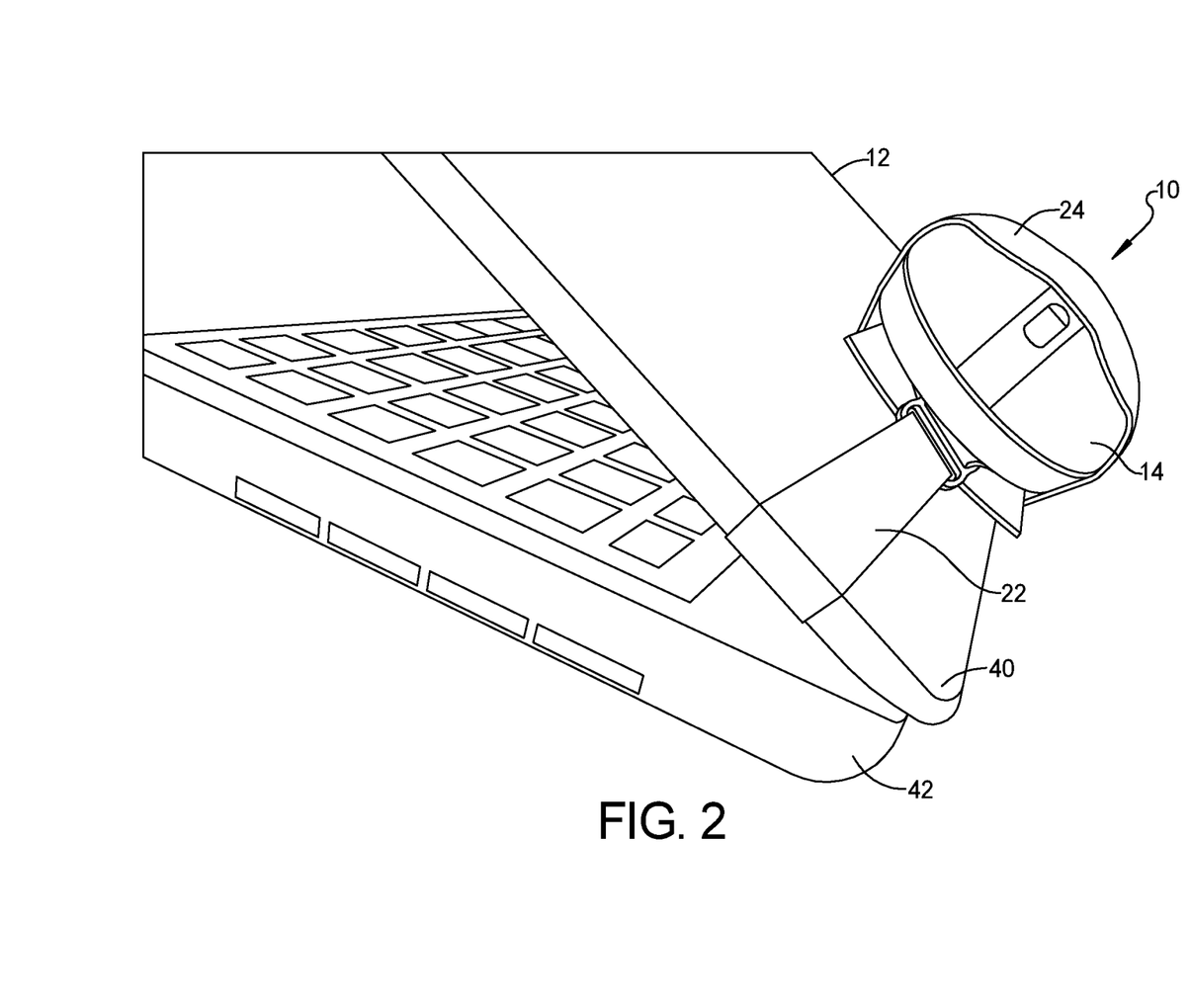
FIG. 2 is a side perspective view of the holder coupled to a laptop cover.

Referring now to FIG. 2, the fastening strap 22 is illustrated only around a cover 40 of the laptop computer 12. The cover 40 typically contains a screen therein. The strap 22 may be positioned below the screen so that the strap 22 may remain secured during use of the laptop 12. The cover 40 is positioned relative to a base 42. In this example, the cover 40 is hingedly coupled to the base 42. The strap 22 may be formed of an elastic material that stretches and thus becomes very thin when stretched to prevent the strap 22 from interfering with closing the cover 40 relative to the base 42.

Figure 3:
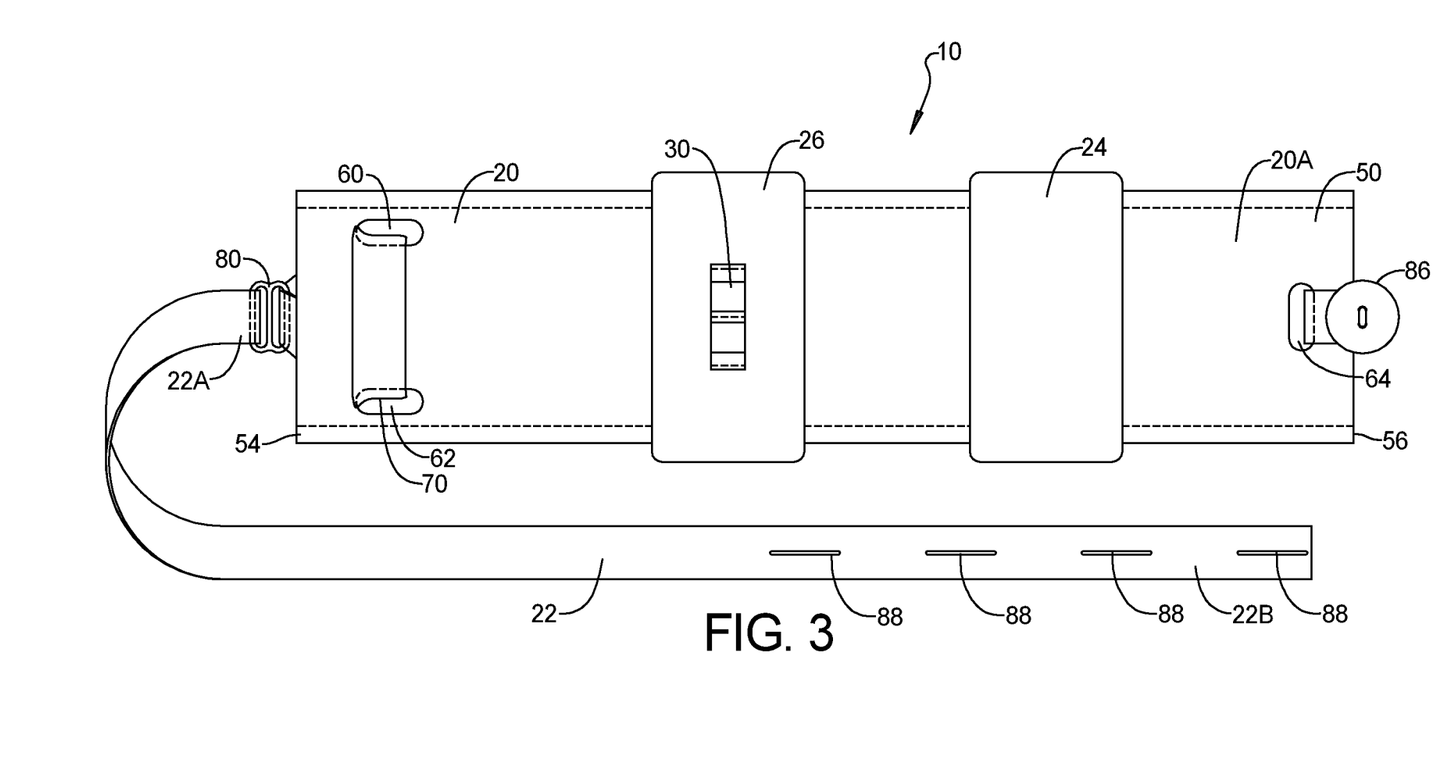
FIG. 3 is a top view of the holder.
Figure 4:
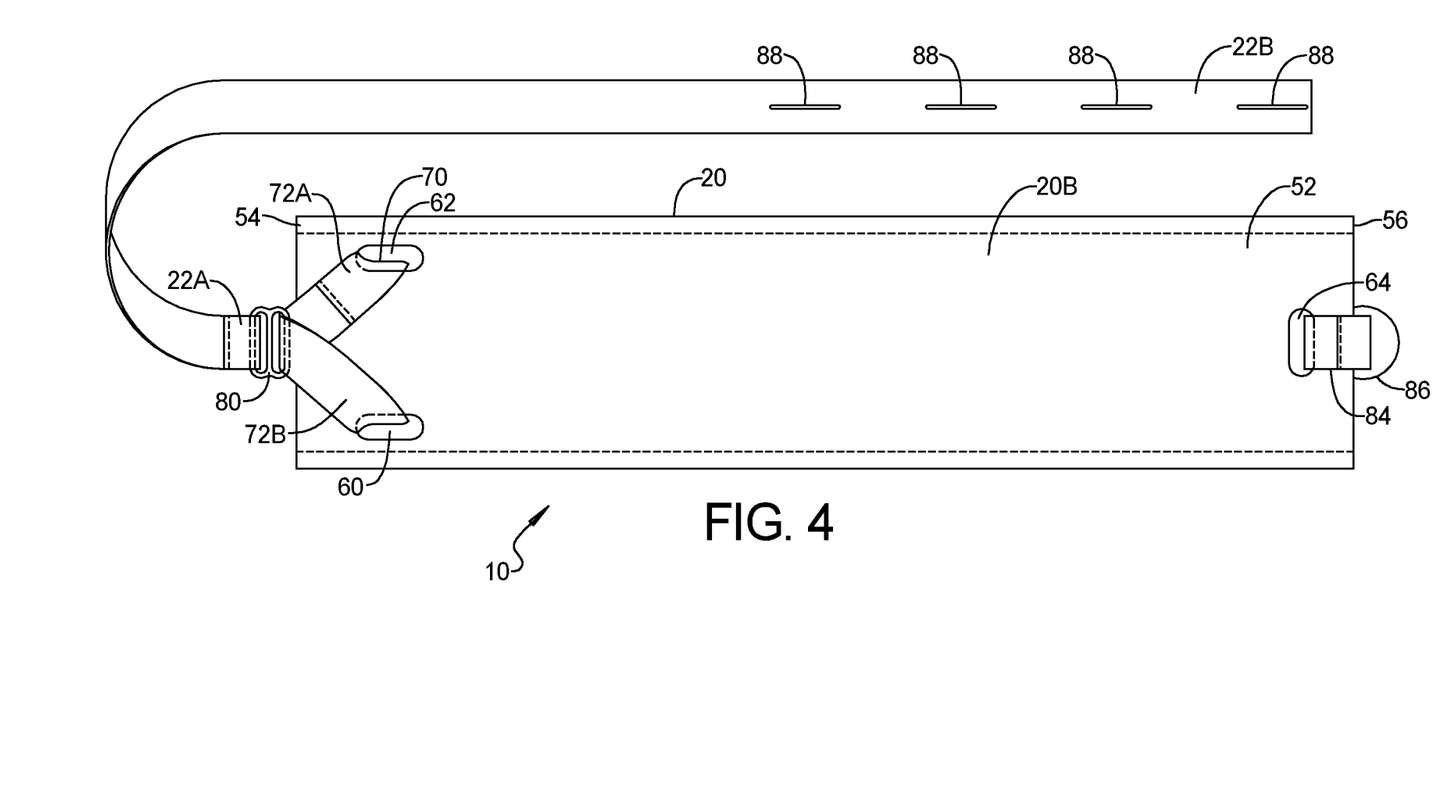
FIG. 4 is a bottom view of the holder.

Referring now to FIGS. 3 and 4, a top view of the holder 10 is illustrated in FIG. 3. A bottom view of the holder is illustrated in FIG. 4. As mentioned above, the holder 10 includes the elongated base 20. The elongated base 20 may be formed of a semi-rigid or firm structure such as, but not limited to, cardboard, foam core or plastic. The elongated base 20 has a front side 20A and a backside 20B. The generally planer backside 20B is placed against the laptop 12 or other device on to which accessories are to be secured.

A first reinforcement layer 50 may extend across the front side 20A. A second reinforcement layer 52 may also extend across the back side 20B. The reinforcement layer 50 may provide a decorative surface and may also provide reinforcement to the rigidity of the elongated base 20. Heavy adhesive vinyl, plastic or duct tape may be used as the reinforcement layers 50, 52.

The elongated base 20 has a first end 54 and a second end 56. The first end 54 includes at least one hole therethrough. In this example, a first hole 60 and a second hole 62 are provided through the first reinforcement layer 50, the second reinforcement layer 52 and the base 20. In this example, the first hole 60 and the second hole 62 are laterally spaced apart and are disposed the same distance from the first end 54. This allows the elongated base 20 to resist twisting during use.

The second end 56 of the elongated base 20 includes a third hole 64 therethrough. The third hole 64 also extends through the first reinforcement layer 50, and the second reinforcement layer 52 and the base 20. The third hole 64, in this example, is positioned in the middle of the width of the elongated base 20.

A first attachment loop 70 is received within the first hole 60 and the second hole 62. The first attachment loop 70 is a continuous loop that is twisted, i.e. a twisted loop. The front side of the first attachment loop 70 is flush with the front side 20A of the elongated base 20. The second or back side of the first attachment loop 70 is twisted. The first attachment loop 70 may be formed by sewing a piece of fabric or elastic with ends having one of which twisted 180 degrees before connecting together. In this manner, the loop has a first arm 72A and a second arm 72B on the backside 20B of the elongated base 20.

A connector 80 is used to couple the first attachment loop 70 to a first end 22A of the fastening strap 22. Various types of connectors such as, but not limited to, a loop or a FIG. 8 connector may be used.

The third hole 64 is used to receive a second attachment loop 84. The second attachment loop 84 has a fastener 86 coupled thereto. The fastener 86 is illustrated as a button. However, other types of fasteners 86 such as Velcro, clips, clasps, ties, snaps or the like may be used. In this example, the fastener 86 is a button sewn to the second attachment loop 84. The second attachment loop 84 may be formed of elastic or other fabric or high strength material onto which the fastener 86 is secured.

A second half of the fastener 86 may be formed on the strap 22. In this example, the second half of the fastener 86 are a plurality of receiving holes 88 through the strap. The plurality of holes 88 may be provided adjacent to each other, in-series, so that various size laptops or other devices may be accommodated.

It should be noted that the first accessory securement loop 24 and the second accessory securement loop 26 have been removed in FIG. 4. The securement loops 24 and 26 may be movably mounted to the elongated base 20. That is, either before or after the assembly of the fastening strap 22, the accessory securement loops 24, 26 may be slid over the elongated base 20. Although two accessory securement loops 24, 26 are illustrated, one or greater than two accessory securement loops may be provided. The accessory securement loops 24, 26 may be made from fabric that is elastic.

Figures 5A, 5B:
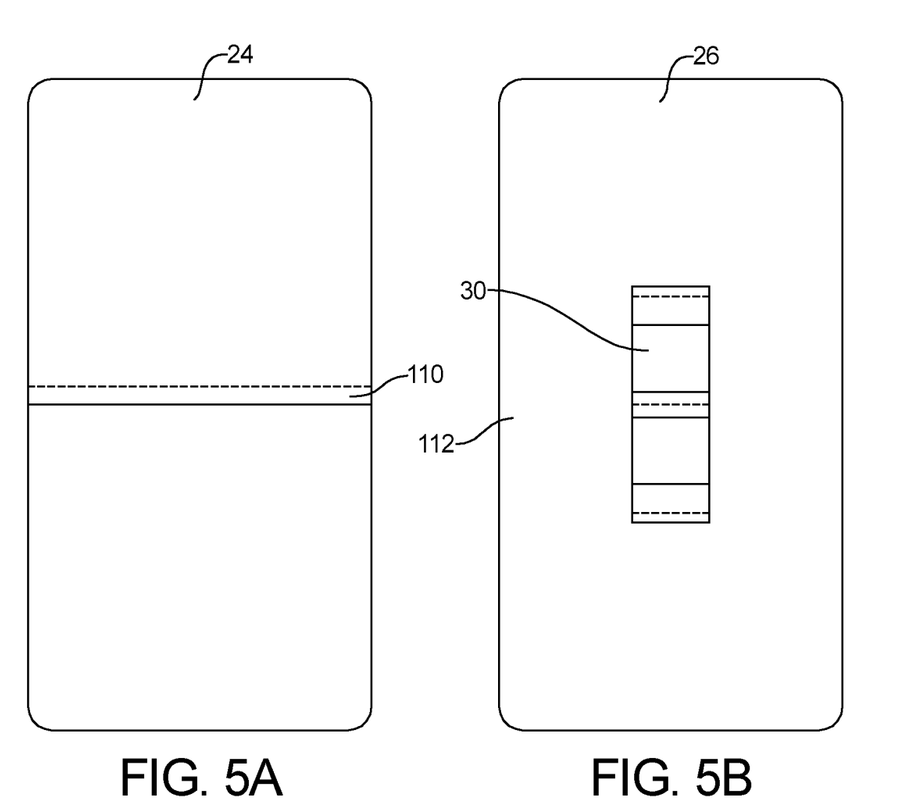
FIG. 5A is a bottom view of the first accessory securement loop.
FIG. 5B is a top view of the second accessory securement loop.

Referring now to FIG. 5A, the first accessory securement loop 24 is illustrated. In this example, ends of a piece of elastic material may be sewn to form a seam 110.

Figure 5C:
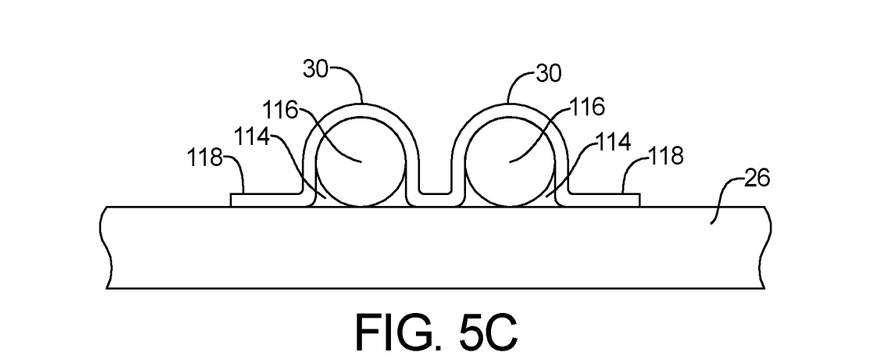
FIG. 5C is an end view of the second accessory securement loop.

Referring now to FIGS. 5B and 5C, the second accessory securement loop 26 is illustrated. In this example, a seam (not shown) may be formed on the opposite side in the same manner as FIG. 5A. On the outer surface 112, the secondary loop 30 includes a receiving portion 114 that is used to secure an elongated device 116 therein. The secondary loop 30 may be sewn or otherwise attached to the outer surface 112 of the second accessory securement loop 26 by way of flanges 118. The flanges 118 may be an integral part of the elastic material of the secondary loop 30.

Figure 6A:
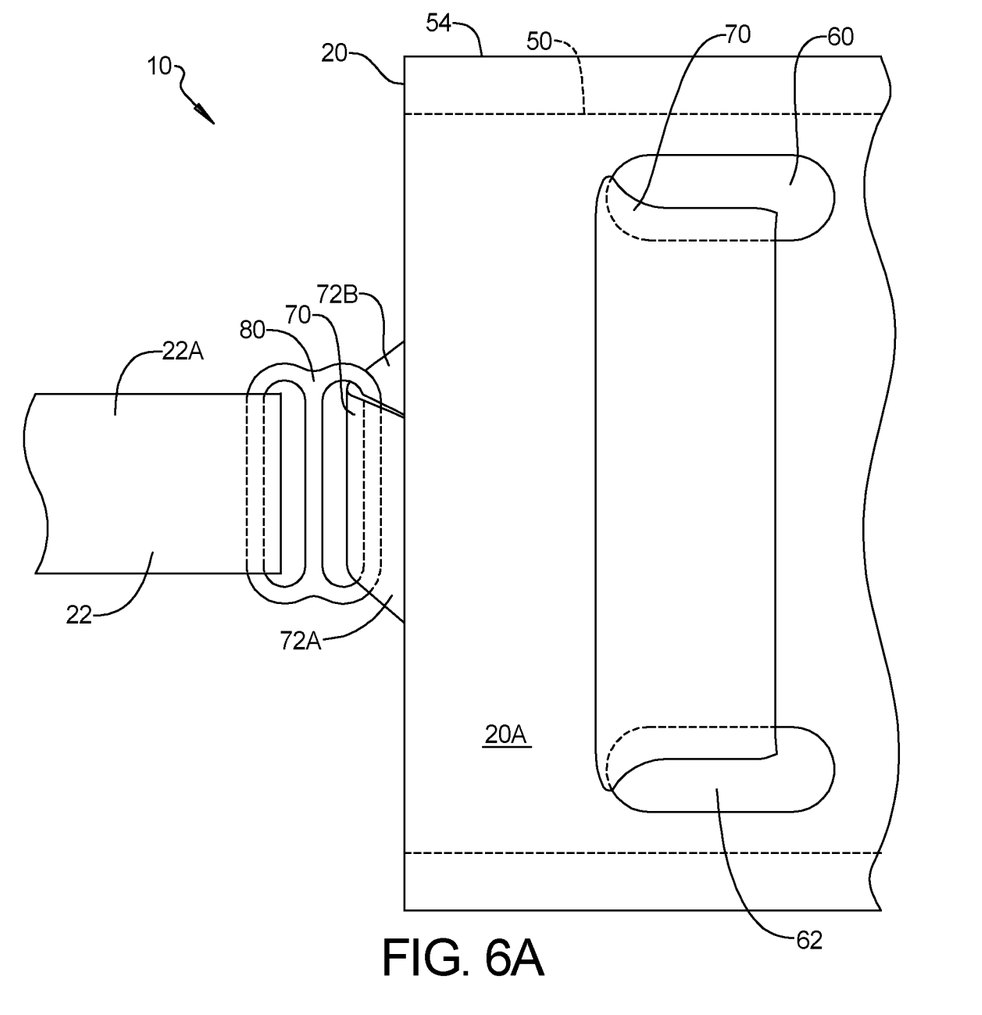
FIGS. 6A and 6B are respective top and bottom views of the first end of the holder.
Figure 6B:
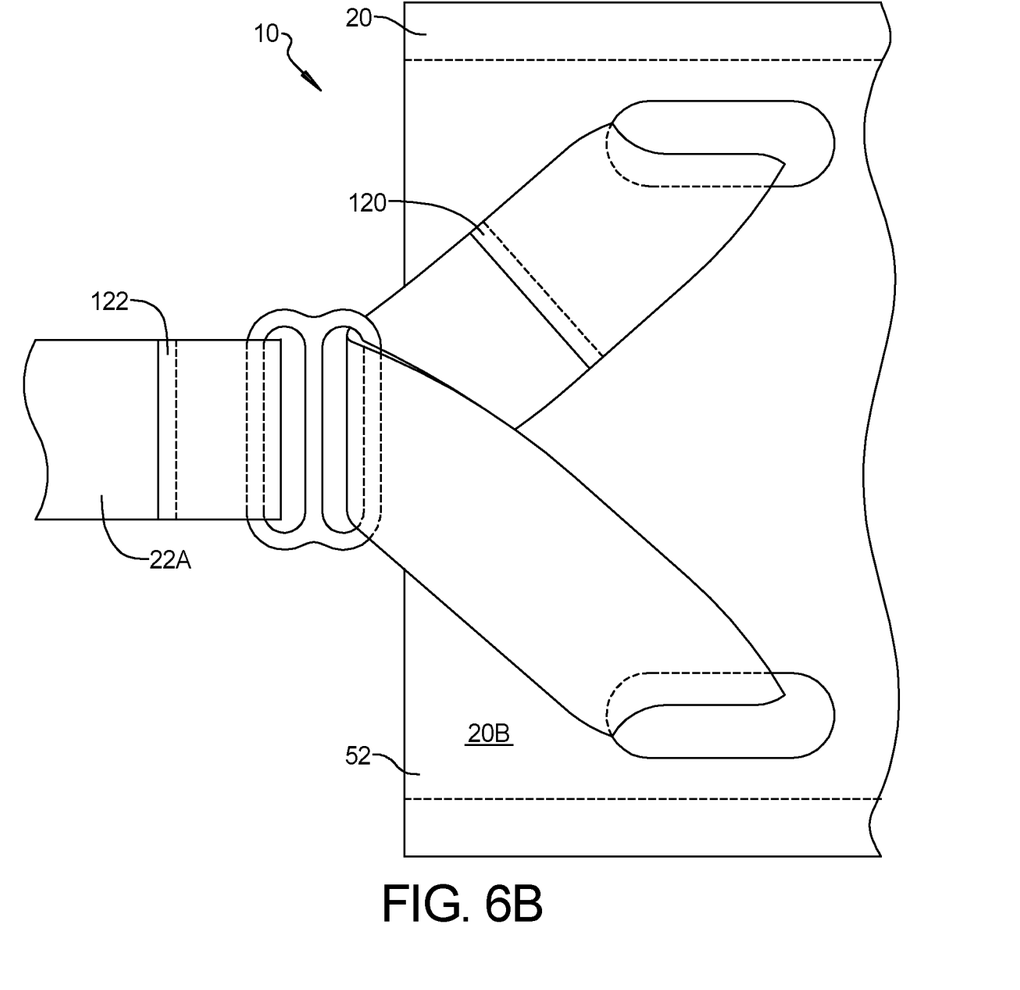

Referring now to FIGS. 6A and 6B, an enlarged view of the top side 20A and the bottom side 20B of the first end 54 are illustrated. In these figures, the seam 120 is more visible. Further, a seam 122 at the second end 22A of the strap 22 is also illustrated.

Figure 7A:
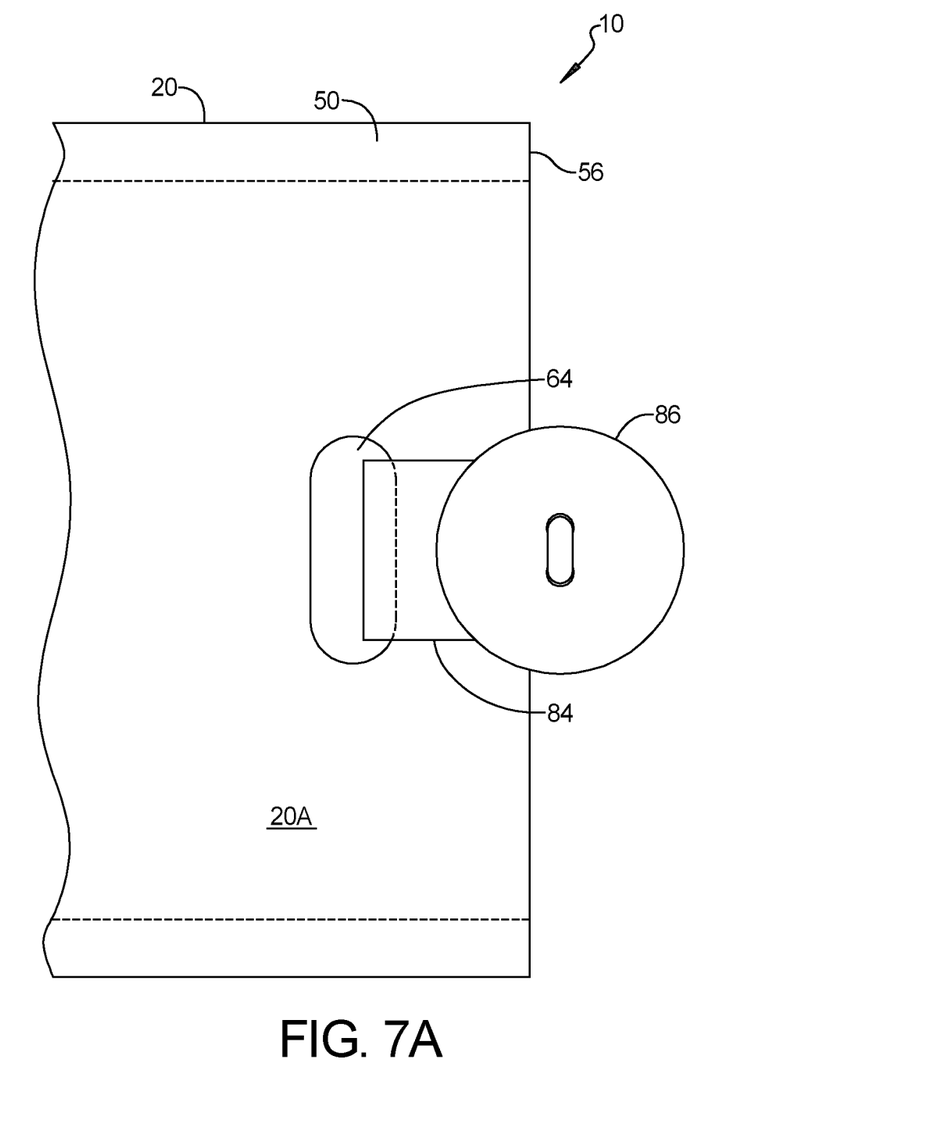
FIGS. 7A and 7B are respective top and bottom views of the second end of the holder.
Figure 7B:
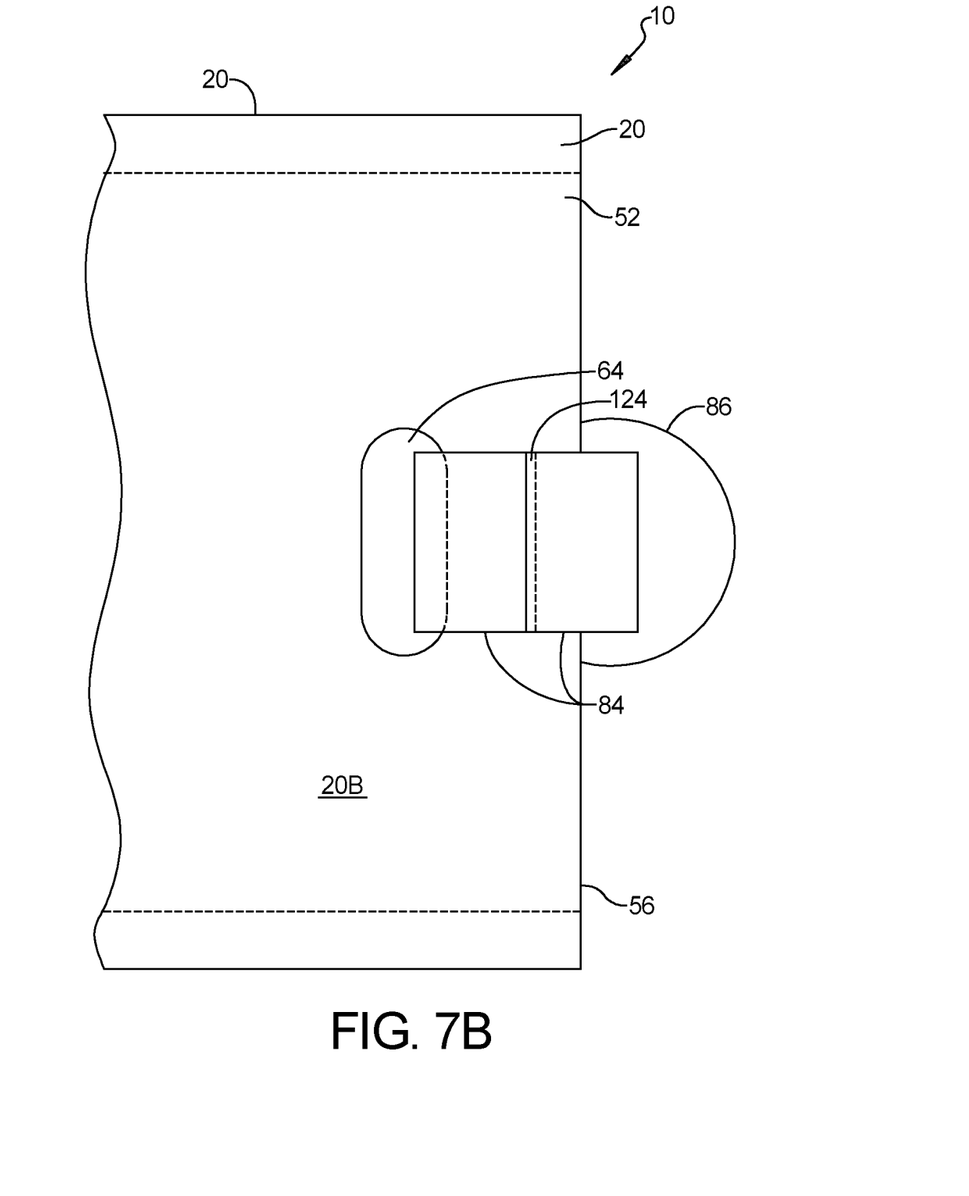

Referring now to FIGS. 7A and 7B, the second end 56 of the elongated base 20 is illustrated. The second attachment loop 84 is formed from a single piece of material in this example. The single piece of material is looped around through the third hole 64 and a seam 124 is formed.

Figure 8:
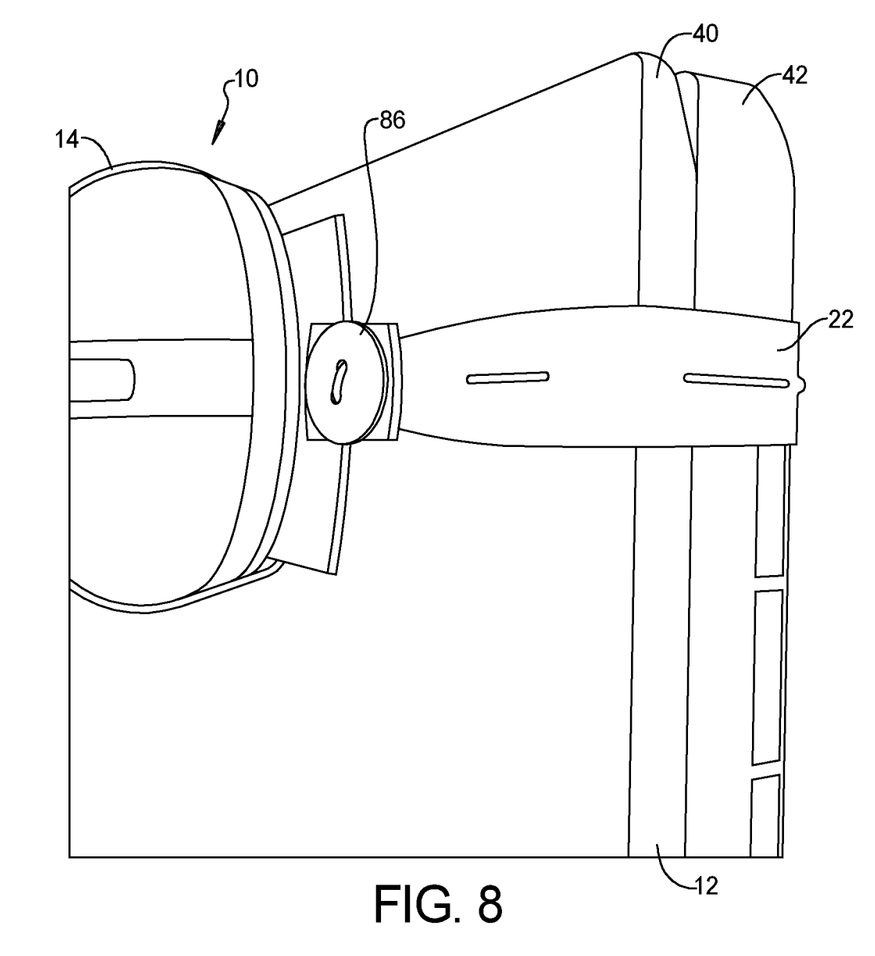
FIG. 8 is a perspective view of the holder having the strap completely around the laptop.

Referring now to FIG. 8, as mentioned above, the strap 22 may extend around the cover 40 as illustrated in FIG. 2. However, the strap 22 may also extend around both the cover 40 and base 42 of the laptop 12 when closed.

The foregoing description has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A holder for non-invasively securing an accessory to a device, comprising:
   an elongated base having a first end and a second end, the first end comprises a first hole and a second hole;
   a fastening strap comprising a first strap end coupled to the first hole and the second hole of the elongated base, the fastening strap extending from the first end of the elongated base to the second end of the elongated base, and the fastening strap extending around the device; and
   a first accessory securement loop disposed around the elongated base for receiving a first accessory therein;
   the elongated base comprises at least one reinforcement layer disposed at least around the first hole and the second hole;
   the first end of the fastening strap is coupled to a first attachment loop, the first attachment loop extending through the first hole and the second hole.

2. The holder of claim 1 wherein the reinforcement layer extending from the first end of the elongated base and at least around the first hole end the second hole to the second end of the elongated base.

3. The holder of claim 1 wherein the first end of the fastening strap comprises a connector connecting the first end and the first attachment loop.

4. The holder of claim 1 wherein the first attachment loop is a twisted loop.

5. The holder of claim 4 wherein the twisted loop is twisted on a second side of the elongated base.

6. The holder of claim 1 wherein the second end of the elongated base comprises a third hole.

7. The holder of claim 6 wherein the third hole is coupled to the second end of the fastening strap.

8. The holder of claim 7 wherein the second end of the elongated base comprises a second attachment loop.

9. The holder of claim 8 wherein the second attachment loop comprises a fastener.

10. The holder of claim 9 wherein the second end of the fastening strap is coupled to the fastener.

11. The holder of claim 10 wherein the fastener comprises a button and wherein the second end of the fastening strap comprises a first receiving hole.

12. The holder of claim 9, wherein the fastener comprises a button and wherein the second end of the fastening strap comprises a plurality of receiving holes disposed in series.

13. The holder of claim 1 further comprising a second accessory securement loop disposed around the elongated base for receiving a second accessory between the elongated base and the first accessory securement loop.

14. The holder of claim 13 wherein the first accessory securement loop and the second accessory securement loop comprise elastic.

15. The holder of claim 1 wherein the first accessory securement loop comprise a secondary loop disposed on an outer surface.

* * * * *